Patented Sept. 22, 1942

2,296,637

UNITED STATES PATENT OFFICE 2,296,637

HIGH SURFACE HIDING PIGMENT MATERIAL AND PROCESS OF MAKING THE SAME

Marion L. Hanahan, Wilmington, Del., assignor to E. I. du Pont de Nemours & Company, Wilmington, Del., a corporation of Delaware No Drawing. Application December 8, 1938, Serial No. 244,572

26 Claims. (Cl. 106—308)

This invention relates to the art of white extender materials. More particularly it relates to the improvement of the properties of white extender materials. Still more particularly it relates to the improvement of the hiding power of white extender materials in flat paint formulations, paper coating compositions, etc.

White extender materials, such as anhydrite, gypsum, calcium sulfite, barium sulfate, calcium carbonate, barium carbonate, silica, magnesium silicates, aluminum silicates, and the like, having indices of refraction of less than about 1.7, are used widely in flat paints as diluents or extenders for white pigment materials such as titanium oxide, titanates of divalent metals, lithopone, zinc sulfide, zinc oxide, antimony oxide, white lead, and the like, comprising prime white pigments having a refractive index of not less than about 1.9. Such white extender materials reduce the expense of the flat paint. Furthermore, by effecting wider separation of the pigment material particles in the paint film they increase the effectiveness of said pigment material. However, these extenders of themselves have very little hiding power.

I have now discovered that the hiding power of white extender materials may be increased markedly if there is imparted to said extender materials a property which I call "surface hiding power" and which I shall discuss hereinafter in more detail. Furthermore, I have discovered a process whereby the property of high surface hiding power may be imparted to white extender materials thereby producing unique extenders of considerable industrial importance. Such extenders have high hiding power in flat paint formulations and as a result, have high flat hiding power in such formulations. Furthermore, I have discovered that they have much higher opacifying and brightening power in starch and casein coating compositions when these compositions are applied to the surface of paper than do corresponding prior art extender materials. As a matter of fact, I have discovered that white extenders having the property of high surface hiding power produce high hiding, opacifying, and/or brightening in all extender-adhesive systems in which the mean index of refraction of the adhesive system is substantially lower than 1.5. A sheet of paper, for example, can be considered to be an adhesive comprising essentially paper fiber having an index of refraction of approximately 1.53 and air of index of refraction of 1. The mean index of refraction of said adhesive is substantially lower than 1.5 and extenders therein having high surface hiding power are definitely better opacifying and brightening agents than are comparable prior art extenders. Again, flat paint films, in which I have found high surface hiding extenders to be so effective, comprise numerous void spaces and/or extender-air interfaces. As a consequence, the effective mean index of refraction of the adhesive portion is substantially lower than that of the binder portion, e. g., is substantially lower than 1.5. I have discovered, however, that in extender-adhesive systems in which the effective mean index of refraction of the adhesive approximates or exceeds 1.5, such as enamel paint films in which the extender is essentially immersed in the binder, high surface hiding power extender materials do not have markedly improved hiding power.

For a better understanding of the characteristics desired in extender materials used in flat paint formulations, it will be necessary to explain the various terms used herein and the method of testing employed:

Flat paint formulation

A flat paint formulation produces a dry paint film in which the binder portion is insufficient to fill all void spaces between pigment and extender particles and which in consequence has a micro rough surface of relatively low specular reflection. Such a paint has a pigment and extender content in excess of about 40% by volume on the dry film and usually in excess of about 50% by volume.

On the other hand, an enamel paint formulation produces a dry paint film in which the binder portion is sufficient to fill essentially all void spaces between pigment and extender particles and which in consequence has a micro smooth surface of relatively high specular reflection. Such a paint has a pigment and extender content of less than about 35% by volume on the dry film and usually less than about 30% by volume.

Hiding power

Hiding power may be defined qualitatively as that property of a paint which enables it to obliterate beyond recognition any background over which it may be spread. Mathematically, it may be expressed as square feet per gallon of paint.

It is determined by the procedure entitled "Krebs dry film incomplete hiding power" described by Henry A. Gardner in "Physical and Chemical Examination of Paints, Varnishes, Lacquers and Colors," 8th edition, January 1, 1937, pp. 45–51.

In this test the paints being studied are painted out on a surface on which a design of concentric light and dark diamonds is printed. The light and dark bands are ½ inch wide. Their lightness factors are 75% and 40% respectively. The area of the surface is one square foot. It is printed on heavy paper and then coated with a nitrocellulose lacquer. In applying the paint a 20 cubic centimeter Luer type glass syringe filled with the paint, and the brush also filled with the paint, are weighed together. The paint is spread uniformly over the chart with the syringe and then spread with the brush. The syringe and brush are again weighed. Several brushouts, for example, six or eight are made with a paint selected as the standard, beginning with five to seven cubic centimeters of paint and increasing the amount in increments of 0.5 to 1.0 cubic centimeter. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7 and 8 cubic centimeters.

When dry, the brushouts are numbered consecutively in the order of increasing quantity of paint for identification. The sample brushouts are then located with respect to their degree of hiding by placing each of them between reference standards showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

Weight of standard paint per gal____lbs__ 15.69
Weight of sample paint per gal_____lbs__ 13.54
Brushout of sample_____g__ 5.40
Brushout of standard 1_____g__ 6.50
Brushout of standard 2_____g__ 7.40
Sample rating_____ 1.4

Hence, weight of standard paint of equivalent hiding is:

$$6.50 + 0.4(7.4 - 6.5) = 6.86 \text{ g.}$$

The volume of which is:

$$\frac{6.86 \times 8.33}{15.69} = 3.64 \text{ cubic centimeters}$$

The volume of the sample is:

$$\frac{5.40 \times 8.33}{13.54} = 3.32 \text{ cubic centimeters}$$

The relative hiding power of the sample is:

$$\frac{3.64}{3.32} \times 100 = 110$$

*Flat hiding power*

Strictly speaking, the expression "hiding power" should be applied only to paint formulae, i. e. to mixtures of pigment and/or extender and vehicle. Nevertheless, pigments and extenders may be said to possess potential hiding power and the potential hiding power of a pigment or extender in a flat paint formulation may be considered to be its flat hiding power. The flat hiding power of an extended pigment, for example, is defined as follows:

$$\text{F. H. P.} = \frac{\text{Wt. standard pigment per unit vol. standard paint}}{\text{Wt. sample pigment per unit vol. sample paint}} \times \text{H. P.}$$

in which F. H. P. is the flat hiding power of the extended pigment and H. P. is the hiding power of the extended pigment sample flat paint as determined by the hereinbefore described "Krebs dry film incomplete hiding power" procedure.

*Oil absorption*

Oil absorption is the amount of oil in grams required to wet 100 grams pigment or extender. The method of testing is described on pages 540–541 of Gardner's above cited book.

A five gram sample is used. Acid refined linseed oil of acid number 12.5 is added slowly from a burette and worked into the pigment or extender with a spatula on a smooth glass plate. The addition of oil is continued a drop or two at a time until the pigment or extender can be collected in one coherent mass adhering to the spatula but not wetting the glass. The amount of oil used to wet the pigment or extender is read from the burette.

This invention has as an object the production of extenders the surface hiding power of which have been increased to an extent heretofore unrealized. A further object is to increase the surface hiding power of extender materials having indices of refraction of not more than about 1.7. A still further object is the provision of extender materials having flat hiding powers markedly higher than those realized heretofore. A still further object is to increase the opacifying power of extender materials employed as paper fillers and in paper coating. A still further object is to increase the oil absorption of extenders. A still further object is to increase extender dry-bulking value, i. e. the volume per unit weight of dry extender. Additional objects will become apparent from an examination of the following description and claims.

These objects are attained according to the herein described invention which broadly comprises mixing a water soluble silicate with an aqueous suspension of an extender, forming a gel-like coating of the major part of the silica on the extender, dewatering the extender suspension and drying the extender without calcination. The extender thereby produced possesses greatly increased oil absorption, dry bulking value, and surface hiding power.

In a more restricted sense, this invention comprises mixing with an aqueous suspension of an extender material between about 0.2% and about 100% or higher, calculated as SiO$_2$ and based on the weight of the extender before treatment, of a water soluble silicate. After the slurry has been agitated sufficiently to insure uniform distribution of the dissolved silicate, it is acidified, thereby precipitating a major part, i. e. 50% or more, of the dissolved silicate on the extender material particles as a coating of gel-like silica. The slurry is subsequently dewatered, as by filtering, and the extender dried without calcination.

The preferred embodiment of this invention comprises mixing with an aqueous suspension of a white extender material, preferably magnesium silicate or clay, comprising in excess of about 250 grams extender per liter, between about 2% and about 20%, calculated as $SiO_2$ and based upon the weight of the extender before treatment, of a water soluble sodium silicate. After the slurry has been agitated sufficiently to insure uniform distribution of the added agent, it is acidified by the addition of sulfuric acid. Subsequently the slurry is dewatered, as by filtering, and the extender dried at a temperature between about 110° C. and about 175° C.

The following examples are given for illustrative purposes and are not intended to place any restrictions or limitations on the herein described invention.

Example I

Sodium silicate solution, containing 23.5% $SiO_2$ and having a $SiO_2:Na_2O$ ratio of 3.8:1, was added to a thick water suspension of magnesium silicate extender in the amount of 2% $SiO_2$ on the basis of the weight of said extender. After being agitated sufficiently to insure even distribution of the sodium silicate, the slurry was acidified with sulfuric acid to a pH of 5.5, filtered and the treated extender dried at 140° C. and disintegrated by passage through a squirrel cage disintegrator.

The aforementioned procedure increased the dry bulking value of the magnesium silicate extender by 28% and increased its oil absorption from 15.7 to 18.9, i. e. increased its oil absorption by 20%. Furthermore, a flat paint formulation having a pigment plus extender/binder ratio of 62.5/37.5 by volume and comprising 21.28% by weight of the treated extender, 39.89% of a 30% $TiO_2$–70% CaSO, pigment, 4.79% China-wood oil, 1.38% heavy bodied Perilla oil, 3.06% acid refined linseed oil, 0.65% bodied linseed oil, 2.02% limed rosin, 0.02% cobalt linoleate drier and 26.9% mineral spirits, had an 8.6% higher hiding power than did a flat paint identical in all respects except that an equal weight of untreated magnesium silicate was substituted for the novel magnesium silicate of my invention. Again, the hiding power of the treated magnesium silicate extender excelled that of the untreated extender by 33% in a flat paint formation having a pigment plus extender/binder ratio of 62.5/37.5 by volume and comprising 49.2% by weight magnesium silicate extender, 11.97% titanium dioxide pigment, 4.79% China-wood oil, 1.38% heavy bodied Perilla oil, 3.06% acid refined linseed oil, 0.65% bodied linseed oil, 2.02% limed rosin, 0.02% cobalt linoleate drier and 26.9% mineral spirits.

Example II

A sodium silicate solution, comprising 23.5% $SiO_2$ and 6.2% $Na_2O$, was added to a water suspension of a paper coating clay comprising 400 grams of clay per liter in the amount of 5% of $SiO_2$ on the basis of the weight of said clay. After being agitated sufficiently to insure even distribution of the sodium silicate, the slurry was acidified with sulfuric acid to a pH of 6, filtered, the treated clay dried at 105° C., and disintegrated by passing it through a squirrel cage disintegrator.

My novel process, as hereinabove exemplified, increased the dry bulking value of the clay by 35% and increased its oil absorption by 30%, its brightening power in a casein paper coating composition by 30%, and its opacifying and brightening power as a paper filler by 21%.

Various arrangements and selections of equipment for the operation of my novel process are possible. In the preferred arrangement I add about 20% on the basis of the pigment, of a sodium silicate solution comprising 23.5% $SiO_2$ and 6.2% $Na_2O$, to a suspension of an extender in water in a mechanically agitated tank. The suspension is agitated sufficiently to insure complete dispersion of the sodium silicate and is then acidified, with sulfuric acid for example, precipitating gel-like silica on the surface of the extender particles. The extender thus treated is filtered, dried at about 140° C., and after dry milling to break up lumps formed on drying is ready for use.

It is to be understood that the herein described specific embodiments of my invention may be subject to variation and modification without departing from the scope of this invention. For instance, while the invention has been described with particular application to the treatment of magnesium silicate and clay, the treatment of other types of white extender materials is also contemplated. Accordingly, the term "extender," as employed herein and in the appended claims includes not only magnesium silicates and clay but also such extender materials as anhydrite, gypsum, barium, sulfate, calcium carbonate, calcium sulfite, barium carbonate, silica, aluminum silicates, aluminum oxide, magnesium fluoride, sodium fluoride, aluminum fluoride, sodium fluosilicate, sodium aluminum fluoride, magnesium fluosilicate, pachnolite, calcium fluoride, and the like, having a refractive index of not more than about 1.7.

It is still further to be understood that the treating agent employed may be a solution of one or any combination of water soluble silicates, such as water soluble silicates of sodium, potassium, rubidium, cesium, and the like. However, because of the superior results obtained therewith, the silicate solutions which I prefer to employ are those of the water soluble sodium silicates, preferably a sodium silicate having a $SiO_2:Na_2O$ ratio of about 3.8:1 by weight.

It is still further to be understood that a coating of the gel-like silica may be formed on the extender material particles by any of the processes well-known in the art whereby a major part, i. e. 50% or more, of the $SiO_2$ of the added water soluble silicate is deposited on the surface of the extender particles, more particularly by acidification of a water soluble silicate comprising extender suspension. In most instances, I prefer to add said water soluble silicate to an extender suspension comprising not less than about 200 grams and preferably not less than about 250 grams of extender per liter and, thereafter, to precipitate the silica on the extender particles by addition of a water soluble acid, such as sulfuric acid, hydrochloric acid, a phosphoric acid, and the like. However, I may practice the herein described invention by addition of the water soluble silicate solution to a previously acidified extender suspension, although on account of the ease of manipulation and the superior results ordinarily obtained thereby, I usually prefer to add the acid after addition of the soluble silicate solution. In any event, it is essential that the extender suspension after treatment with the water soluble silicate and acid should have a pH of less than about 7, and preferably less than about 6. After the silica has been precipitated on the extender material particles by reaction of the water soluble silicate with the acid, to provide an extender suspension having a pH of less than about 7, and preferably less than about 6, I usually prefer to adjust the pH of said extender suspension to more than about 6 and preferably more than about 7 prior to the dewatering of said suspension, as by the addition of an alkaline reacting material such as barium hydroxide, sodium carbonate, and the like.

It is still further to be understood that the amount of treating agent required by a given extender material can best be learned by experimental trial and the amount will vary with the treating agent, the type and previous history of the extender material, the concentration of the extender slurry, and the properties desired in the finished extender. With the agents which I have found most satisfactory, viz., sodium silicates, appreciable effects are had by addition of the silicates in an amount corresponding to as little as about 0.2% $SiO_2$ based upon the weight of extender in the slurry. For most ordinary purposes, however, I prefer to add the silicate in amounts equivalent to from about 2% to about 20% $SiO_2$. For increased effects, the silicate may be added in amounts equivalent to as much as about 100% $SiO_2$ or higher.

It is still further to be understood that the optimum amount of gel-like structure silica precipitated on the surface of the extender material particles can best be learned by experimental trial and the amount will vary with the precipitating conditions, the type and previous history of the extender material, and the properties desired in the finished extender. Appreciable effects are had when the extender is coated with gel-like silica in an amount corresponding to as little as about 0.2%, calculated as $SiO_2$ and based on the weight of the extender before treatment. Increased effects are obtained when said silica is present in amounts equivalent to as much as about 100% $SiO_2$ or higher. For most ordinary purposes, however, optimum results are had, when the novel high surface hiding power extender of this invention comprises between about 2% and about 20%, calculated as $SiO_2$ and based on the weight of the extender before treatment, of a gel-like structure of uncalcined silica precipitated on the extender particles.

It is still further to be understood that drying of the extender coated with gel-like silica is an essential step in my novel process. It is essential that the extender after being coated with the gel-like silica should not be calcined. I have found it desirable to dry the extender at a temperature not in excess of about 300° C., and preferably not in excess of about 200° C. Temperatures of less than about 100° C. should be avoided unless the extender is dried at sub-atmospheric pressures.

The herein described process imparts to extender materials a new property which I call "surface hiding power." The treating agent forms an amorphous gel surrounding the extender particles. Upon drying, this leaves a system of extender particle aggregates stabilized by a skeleton structure of the gel. Thus the treated extender is more porous and bulky than the untreated extender. As a consequence of my novel treatment there are imparted to extender materials, not only the property of surface hiding power, but also the properties of hitherto unrealized high oil absorption, high dry bulking value, high flat hiding power, and high opacifying and brightening power in paper and in coating compositions of casein, starch and the like when applied to the surface of paper.

Minor increases in surface hiding power are of little industrial importance. Therefore, the extenders produced according to my novel process, as compared with prior art extenders, have an increase of at least about 10% and preferably at least about 15% in oil absorption, flat hiding power, and dry bulking value. Further, the opacifying and brightening power of said extenders is increased by at least about 10% and preferably at least about 15%, i. e. the opacifying and brightening power of coatings of casein, starch, and the like, when applied to paper is increased at least about 10% and preferably at least about 15%.

It is to be understood that the increase in opacifying and brightening power mentioned hereinabove, refers to the increased efficiency of an extender in a paper coating composition, i. e. an extender is defined as having $x\%$ higher opacifying and brightening power than another extender when 100 parts by weight of a coating composition, prepared as hereinafter described, comprising said extender, produces paper coatings equal in opacity and brightness to those produced by $100+x$ parts by weight of a similarly prepared coating composition comprising the other extender. The aforementioned coating compositions are prepared in the following manner. A casein solution is prepared by stirring 100 parts by weight casein for one-half hour in 450 parts water, adding thereto 4 parts borax and 6 parts trisodium phosphate dissolved in 80 parts water at 65° C., heating the resultant mixture to 65° C. with stirring on a water bath, adding 10.85 parts by weight of ammonium hydroxide solution comprising 27% $NH_3$ by weight, allowing the whole to cool with stirring, and diluting with water to a total of 667 parts by weight. 25 parts by weight of the resultant casein solution is stirred into an intimately mixed extender water composition consisting of 43.7 parts by weight water and 31.25 parts extender.

My process possesses advantages not previously combined in a single process. Furthermore, the products of my process possess advantages not previously combined in an extender material. The high surface hiding extender resulting from the operation of my process, when used in flat paint formulations, imparts heretofore unrealized high hiding to the dry paint films. Such paint formulations are prepared at essentially the same cost and are far superior to flat paints hitherto manufactured. Furthermore, the novel extender products of my invention, when employed as paper fillers or in compositions of starch, casein, glue and the like applied to the surface of paper, produce papers which are definitely superior in opacity and brightness to those treated in an analogous manner with corresponding prior art extenders.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing an extender of improved surface hiding power which comprises mixing a water soluble silicate with an aqueous suspension of an extender, precipitating silica as a gel-like coating on said extender by acidifying the suspension, dewatering the suspension and drying the extender without calcination.

2. A process for producing an extender of improved surface hiding power, which comprises mixing with an aqueous suspension of an extender a water soluble silicate and a water soluble acid thereby precipitating at least 50% of the silica as a gel-like coating on said extender, dewatering the suspension and drying the extender without calcination.

3. A process for producing an extender of improved surface hiding power, which comprises mixing a water soluble silicate with an aqueous suspension of an extender, acidifying the slurry thereby precipitating at least 50% of the silica as a gel-like coating on said extender, and thereafter dewatering the slurry and drying the extender without calcination.

4. A process for producing an extender of improved surface hiding power, which comprises mixing with an aqueous suspension of an extender between about 0.2% and about 100%, calculated as $SiO_2$ and based on the weight of the extender before treatment, of a water soluble silicate, acidifying the slurry, dewatering said slurry and drying the extender at a temperature not in excess of about 300° C.

5. A process for producing an extender of improved surface hiding power, which comprises mixing with an aqueous suspension of an extender between about 2% and about 20%, calculated as $SiO_2$ and based on the weight of the extender before treatment, of a water soluble silicate, acidifying the slurry by the addition of sulfuric acid, and subsequently dewatering the slurry and drying the extender at a temperature not in excess of about 200° C.

6. A process for producing an extender of improved surface hiding power, which comprises mixing sodium silicate with an aqueous suspension of an extender, acidifying the slurry thereby precipitating silica as a gel-like coating on said extender, and thereafter dewatering the slurry and drying the extender without calcination.

7. A process for producing an extender of improved surface hiding power, which comprises mixing with an aqueous suspension of an extender between about 0.2% and about 100%, calculated as $SiO_2$ and based on the weight of the extender before treatment, of sodium silicate, acidifying the slurry, dewatering said slurry and drying the extender at a temperature not in excess of about 300° C.

8. A process for producing an extender of improved surface hiding power, which comprises mixing with an aqueous suspension of an extender between about 2% and about 20%, calculated as $SiO_2$ and based on the weight of the extender before treatment, of sodium silicate, acidifying the slurry by the addition of sulfuric acid, and subsequently dewatering the slurry and drying the extender at a temperature not in excess of about 200° C.

9. An extender of improved surface hiding power and of substantially porous, balky nature which comprises an extender coated with uncalcined gel-like silica.

10. An extender of improved surface hiding power which comprises an extender coated with uncalcined gel-like silica in an amount in the range of from about 0.2% to about 100%, calculated as $SiO_2$ and based on the weight of the extender before treatment.

11. An improved extender comprising a white extender coated with uncalcined gel-like silica, said improved extender being substantially porous and bulky in character and having at least about 10% higher opacifying and brightening power than a comparable untreated extender.

12. An improved extender whose particles are coated with between about 0.2% and about 100%, calculated as $SiO_2$, of uncalcined gel-like silica, said improved extender having at least about 10% greater opacifying and brightening power than a similarly prepared extender not coated with said gel-like silica.

13. A process for producing an extender of improved surface hiding power which comprises mixing an aqueous suspension comprising a water soluble silicate, an extender, and an acidic reagent, thereby precipitating silica as a gel-like coating on said extender, dewatering the suspension and drying the extender without calcination.

14. A process for producing an extender of improved surface hiding power which comprises mixing an aqueous suspension comprising a water soluble silicate, magnesium silicate, and an acidic reagent, thereby precipitating silica as a gel-like coating on said magnesium silicate, dewatering the suspension and drying the extender without calcination.

15. A process for producing an extender of improved surface hiding power which comprises mixing an aqueous suspension comprising a water soluble silicate, clay, and an acidic reagent, thereby precipitating silica as a gel-like coating on said clay, dewatering the suspension and drying the extender without calcination.

16. A process for producing an extender of improved surface hiding power, which comprises mixing with an aqueous suspension of an extender between about 2% and about 20%, calculated as $SiO_2$ and based on the weight of the extender before treatment, of a water soluble silicate, acidifying the slurry by the addition of sulfuric acid, and subsequently dewatering the slurry and drying the extender at a temperature between about 110° C. and about 175° C.

17. A process for producing an extender of improved surface hiding power which comprises mixing with an aqueous suspension of an extender between about 2% and about 20%, calculated as $SiO_2$ and based on the weight of the extender before treatment, of sodium silicate, said sodium silicate having an $SiO_2:Na_2O$ ratio of about 3.8:1 by weight, acidifying the slurry by the addition of sulfuric acid, and subsequently dewatering the suspension and drying the extender at a temperature between about 110° C. and about 175° C.

18. A process for producing an extender of improved surface hiding power which comprises mixing with an aqueous suspension of magnesium silicate between about 0.2% and about 100%, calculated as $SiO_2$ and based on the weight of the magnesium silicate before treatment, of a water soluble silicate, acidifying the slurry, dewatering said slurry and drying the magnesium silicate at a temperature not in excess of about 300° C.

19. A process for producing an extender of improved surface hiding power which comprises mixing with an aqueous suspension of clay between about 0.2% and about 100%, calculated as $SiO_2$ and based on the weight of the clay before treatment, of a water soluble silicate, acidifying the slurry, dewatering said slurry and drying the clay at a temperature not in excess of about 300° C.

20. An extender of improved surface hiding power which comprises an extender coated with uncalcined gel-like silica in an amount in the range of from about 2% to about 20%, calculated as $SiO_2$ and based on the weight of the extender before treatment.

21. An extender of improved surface hiding power which comprises magnesium silicate coated with uncalcined gel-like silica in an amount in the range of from about 0.2% to about 100%, calculated as $SiO_2$ and based on the weight of the magnesium silicate before treatment.

22. An extender of improved surface hiding power which comprises clay coated with uncalcined gel-like silica in an amount in the range of from about 0.2% to about 100%, calculated as $SiO_2$ and based on the weight of the clay before treatment.

23. A pigment of improved hiding power comprising an inert pigment base, and the reaction product of an alkali metal silicate and an acid capable of precipitating the silicate in insoluble form, the amount of said reaction product being in amount sufficient to increase the hiding power of the pigment.

24. A pigment of improved hiding power comprising an inert pigment base and the reaction product of an alkali metal silicate and an acid capable of precipitating the silicate in insoluble form, the amount of said reaction product ranging from about 2% to about 20%, calculated as $SiO_2$ and based on the weight of the inert pigment base before treatment.

25. A pigment of improved hiding power comprising an inert pigment base and the precipitated, insoluble reaction product of sodium silicate and sulfuric acid, the amount of said reaction product being sufficient to increase the hiding power of the pigment.

26. A pigment of improved hiding power comprising an inert pigment base and in intimate association therewith the precipitated, insoluble reaction product of sodium silicate and sulfuric acid, the amount of said reaction product ranging from about 2% to about 20%, calculated as $SiO_2$ and based on the weight of the inert pigment base before treatment.

MARION L. HANAHAN.